United States Patent [19]

Davis

[11] 3,967,359

[45] July 6, 1976

[54] LOADING DEVICE FOR INSTALLATION OF ROTARY ENGINE OIL SEALING RINGS

[75] Inventor: Lewis M. Davis, Muskegon, Mich.

[73] Assignee: Sealed Power Corporation, Muskegon, Mich.

[22] Filed: Oct. 23, 1974

[21] Appl. No.: 517,087

[52] U.S. Cl. .................................................. 29/235
[51] Int. Cl.² ........................................ B23P 19/02
[58] Field of Search ............ 29/235, 270, 283, 450, 29/451; 30/113.1

[56] References Cited
UNITED STATES PATENTS

| | | | |
|---|---|---|---|
| 1,069,539 | 8/1913 | Evans, Jr. | 29/235 |
| 2,557,191 | 6/1951 | King | 30/113.1 |
| 2,990,615 | 7/1961 | Ohler | 30/113.1 |
| 3,115,701 | 12/1963 | Jones | 29/235 |
| 3,145,463 | 8/1964 | Hockett | 29/235 |
| 3,694,894 | 10/1972 | Jelinek et al. | 29/235 |

*Primary Examiner*—James L. Jones, Jr.
*Attorney, Agent, or Firm*—Barnes, Kisselle, Raisch & Choate

[57] ABSTRACT

A loading device for installation of rotary engine oil sealing rings into paired concentric circular grooves in a rotor end face comprising an annular sleeve having an inside diameter equal to the outside diameter of the radially inner groove and an outside diameter equal to the inside diameter of the radially outer groove, which sleeve rests upon the rotor end face in the annular surface area between the two grooves. The sleeve has a pair of generally radially facing inner and outer conical surfaces converging axially outwardly of the rotor for gradual loading of the resilient elastomeric static oil seals during axial installation thereof into the respective grooves.

7 Claims, 7 Drawing Figures

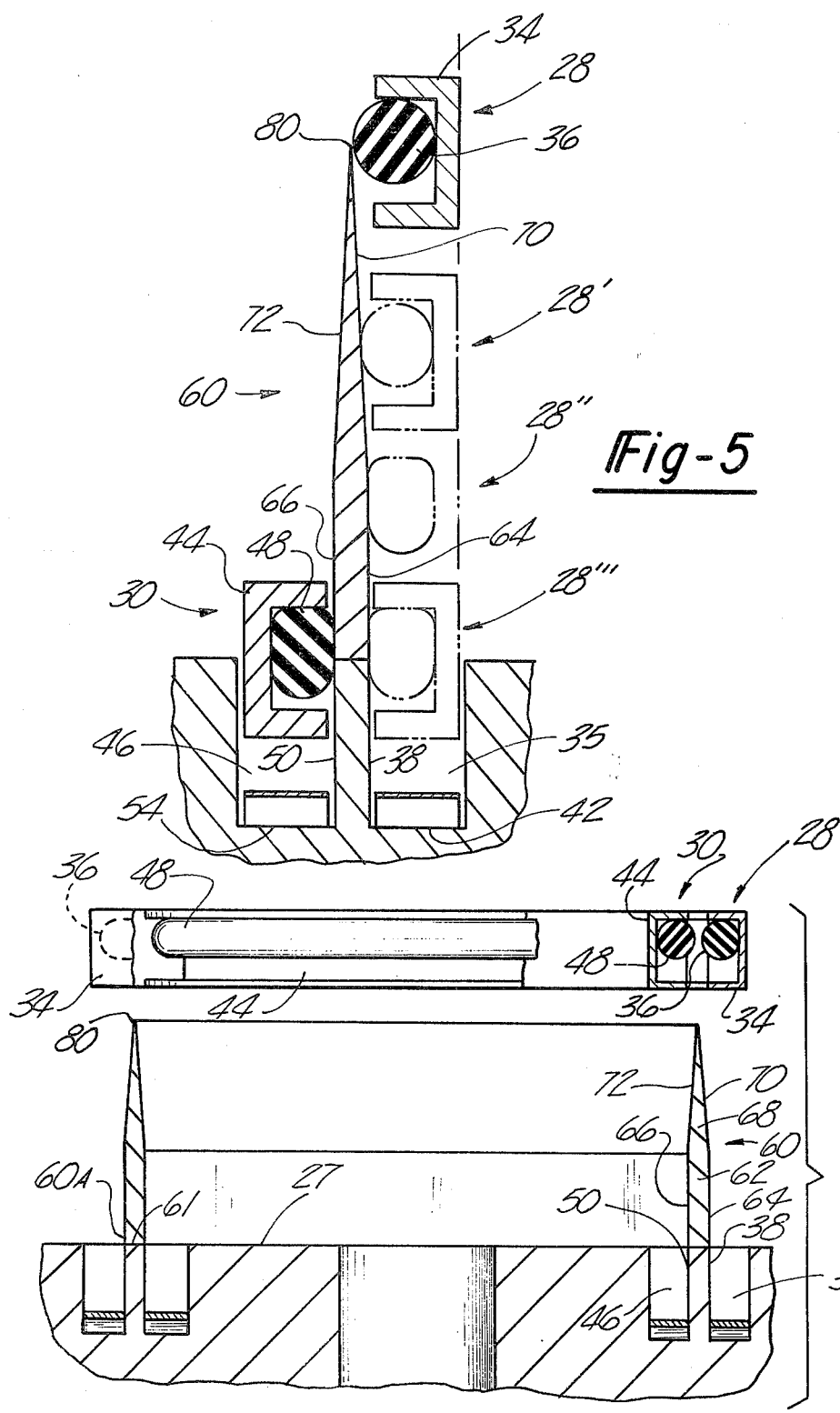

LOADING DEVICE FOR INSTALLATION OF ROTARY ENGINE OIL SEALING RINGS

This invention relates generally to rotary engine oil sealing ring assembly and to a device for installation thereof.

Conventional oil seals for Wankel rotary engines include an annular metal sealing ring of C-shape in cross section, and an elastomeric O-ring captured within the "C". The sealing ring assembly is installed in a circular groove in the rotor end face and is urged into sealing abutment with the rotor housing end wall by a hump-type spring disposed between the ring and the groove root. This type of oil seal is shown in the U.S. patents of Okamoto U.S. Pat. No. 3,456,624 and Yamamoto et al. U.S. Pat. No. 3,300,127.

To provide an oil seal, the resilient O-ring is distorted or crushed between the metal sealing ring and an opposing groove side wall. Prior to installation into the groove, the sealing edge of the O-ring extends radially beyond the groove wall so that the O-ring may be crushed or distorted during installation to provide the resilient forces necessary for proper sealing. When the oil ring assembly is being installed into the groove, the radially facing sealing edge of the O-ring will contact and interfere with the axially outer edge of the opposing groove wall. This interference tends to twist the O-ring as the oil ring assembly is pushed further into the groove as indicated by the arrow and shown in FIG. 6. This twisting action results in local variations in the cross section of the O-ring, which variations will cause loss of sealing contact between the sealing edge of the O-ring and the opposing groove wall and resultant failure of the ring to provide the required seal.

It is an object of the present invention to provide a device which will properly load an oil ring seal of the above-discussed type so that the seal will have a uniform cross section when inserted into the rotor groove and satisfactorily accomplish the sealing function intended.

It is another object of the present invention to provide a loading device which will accomplish the object set forth above while simplifying the oil seal installation procedure, thereby reducing the cost of the overall rotor assembly.

The novel features which are considered characteristic of the present invention are set forth in particular in the appended claims. The invention itself, however, together with additional objects, features and advantages thereof will be best understood from the following description when read in connection with the accompanying drawings in which:

FIG. 4 is a sectional view taken along the line 4—4 of FIG. 3 showing the oil ring seals positioned for axial installation into the rotor grooves;

FIG. 5 is an enlarged sectional view of the loading device and oil ring seals showing the oil seals being installed into the circular rotor grooves;

Figure 6:
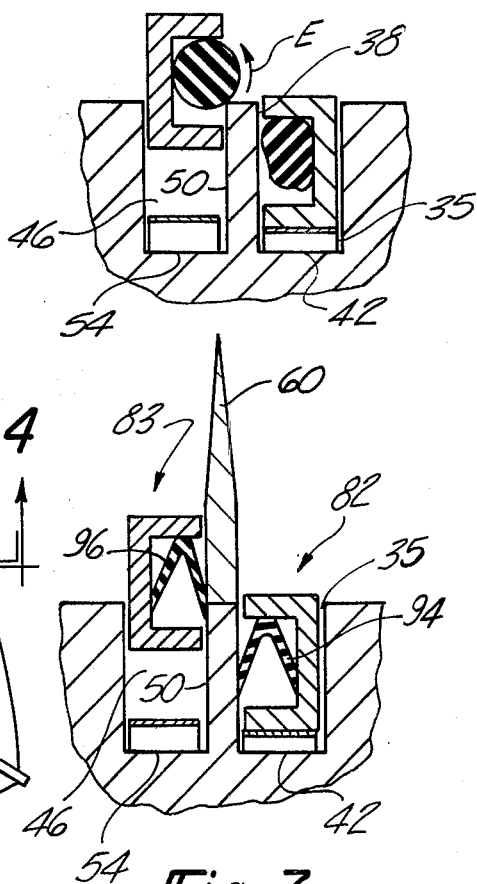
Figure 7:
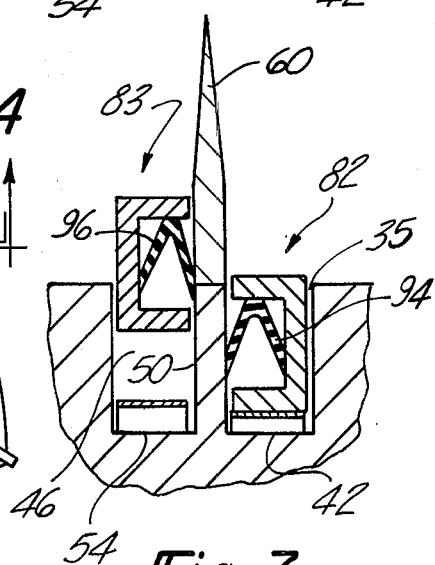

FIG. 6 is illustrative of a prior art method of assembling an oil ring assembly in a rotor groove showing on the left how the resilient ring will twist as indicated by the arrow E and tend to extrude out of the top of the sealing ring assembly as the assembly is forced into the groove, and the right hand portion of FIG. 6 shows the oil ring assembly of the prior art fully seated in the oil ring groove with the O-ring twisted and not making contact with the side of the groove at this point and thus will not provide an oil seal; and FIG. 7 shows the loading of an alternate form of an oil sealing ring.

Figure 1:
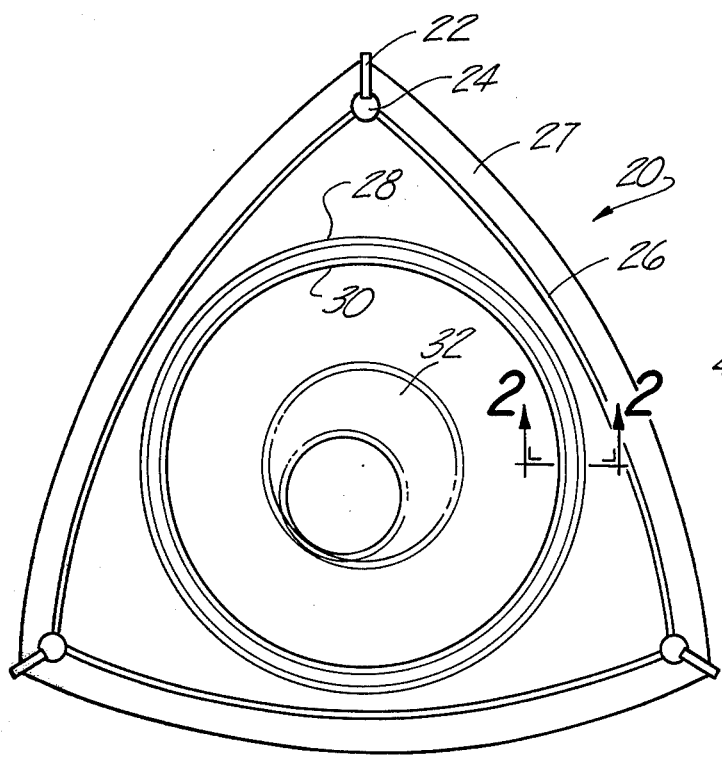
FIG. 1 is a side view of a rotor assembly for a rotary internal combustion engine with its oil ring seals.

Referring to FIG. 1, a triangular-shaped internal combustion engine rotor 20 has the apex seals 22 installed in the rotor apexes to abut the trochoidally shaped internal peripheral wall of an engine housing (not shown). The intermediate seals 24 and the compression seals 26 are installed in the rotor end face 27 to abut the engine housing end wall and to act together with apex seals 22 to seal the various peripheral chambers from each other in a manner well known in the art. A pair of concentric oil ring seals 28,30 are provided in each rotor end face 27 radially inwardly of compression seals 26 to abut the housing end wall and prevent the flow of oil from the rotor crank case 32 into the peripheral combustion chambers.

Figure 2:
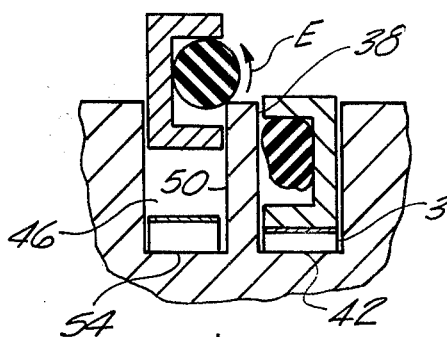
FIG. 2 is a sectional view taken along the line 2—2 of FIG. 1 which shows in particular the oil seals installed in the circular rotor grooves.

Referring to FIG. 2, radially outer oil seal 28 comprises an annular metal sealing ring 34 of C-shape cross section disposed within a circular groove 35 in rotor end face 27. Resilient elastomeric O-ring 36 is captured within the C and is pressed or "crushed" against the opposing radially inner groove wall 38 to provide an oil seal between crank case 32 and the engine chambers. Sealing ring 34 is urged axially outwardly against the housing end wall by a wave or hump spring 40 disposed between ring 34 and the groove root 42. Similarly, radially inner oil ring seal assembly 30 comprises an annular sealing ring 44 disposed in a circular groove 46 concentric with groove 35. Ring 44 is C-shape in cross section and has an O-ring 48 enclosed therein and distorts or crushes the O-ring against the opposing radially outer wall 50 of groove 46. A hump spring 52 is disposed between ring 44 and root 54 of groove 46 to urge ring 44 against the housing end wall. The oil seals shown in FIG. 2 are well known in the art and are discussed in greater detail in the above-mentioned patents of Okamoto and Yamamoto et al., the disclosures of which are incorporated herein by reference. The oil seal configuration shown in FIG. 2 does not, of itself, form a part of the present invention.

O-rings 36 and 48 to provide an adequate oil seal are pressed against groove side walls 38 and 50 with sufficient force to inhibit oil flow therebetween. The relaxed diameter of the radially inner sealing edge of outer O-ring 36 is less than the diameter of opposing groove wall 38. The relaxed diameter of the radially outer sealing edge of O-ring 48 is greater than the diameter of groove wall 50. The loading device of the present invention prevents interference between the axially outer edges of groove walls 38,50 and the sealing edges of O-rings 36,48 during installation of the O-rings into the respective grooves as will now be described.

Figure 3:
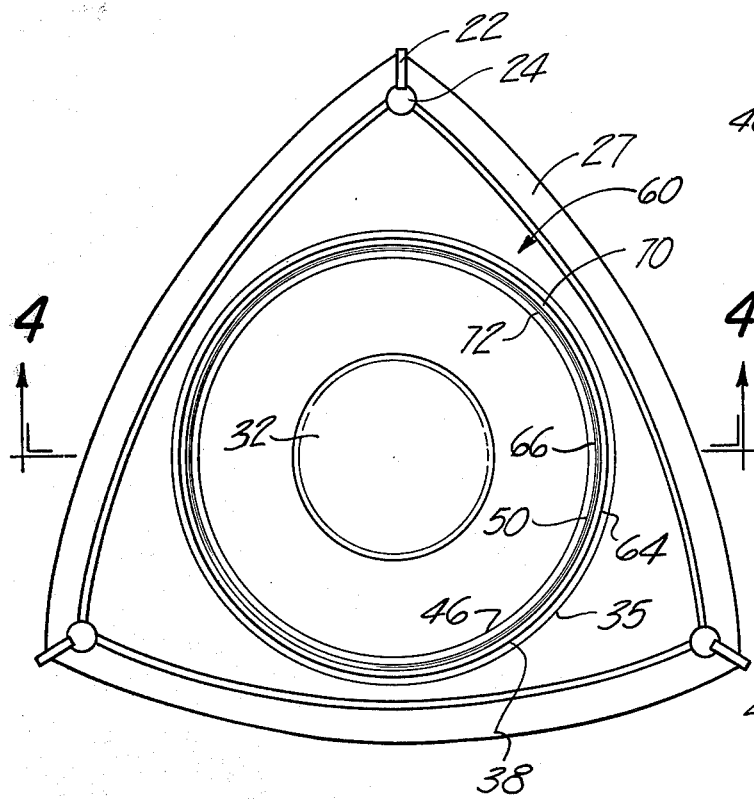
FIG. 3 is a plan view of the rotor assembly depicted in FIG. 1 showing the loading device of the present invention resting upon the end face of the rotor.

Referring to FIGS. 3 and 4, the loading device provided by the present invention comprises an annular tapered sleeve 60 having an inner diameter at its base equal to the diameter of groove wall 50 and an outer diameter at its base equal to the diameter of groove wall 38. In use the sleeve rests with its base 60A upon end face 27 in the annular end face surface area 61 between circular grooves 35 and 46. Sleeve 60 includes a hollow cylindrical portion 62 which rests upon surface area 61 between, coaxially with, grooves 35 and 46 and has the outwardly and inwardly facing cylindrical walls surfaces 64 and 66 which are radially aligned with groove walls 38 and 50 respectively. Extending axially outwardly of cylindrical portion 62, sleeve 60 also includes a tapering portion 68 defined by a pair of generally radially facing, axially outwardly converging radially outer and inner conical surfaces 70 and 72 respectively which terminate at apex 80. Surfaces 70 and 72 have a common diameter which is between, and preferably halfway between, the diameters of cylindrical surfaces 64 and 66. Surfaces 70 and 72 taper axially inwardly into surfaces 64 and 66 respectively.

The operation of the loading device will be understood with reference to FIGS. 4 and 5 in which oil ring seal assemblies 28 and 30 are respectively depicted at selected states of installation. Sleeve 60 is placed with its base 60A against surface 61 between grooves 35 and 46. Seal assembly 28 is axially aligned with sleeve 60 and groove 35 as in FIG. 4 and then pushed axially inwardly or downwardly along conical surface 70 and cylindrical surface 64 into groove 35, successive positions of seal 28 being depicted in FIG. 5 by phantom positions 28', 28" and 28'". A similar procedure is followed in loading oil ring assembly 30 into groove 46. Assemblies 28 and 30 are shown in final or loaded position in FIG. 2.

The common diameter of conical surfaces 70,72 is less than the diameter of the radially inner sealing edge of O-ring 36 and, correspondingly, greater than the diameter of the radially outer sealing edge of O-ring 48 so that the respective O-rings first contacts sleeve 60 along surfaces 70,72. In this manner, as seal 28 is moved axially through positions 28' and 28", conical surface 70 applies a uniformly increasing radial load to O-ring 36 and the O-ring is gradually compressed without twisting between tapered surface 70 and ring 34 so that, when the seal reaches position 28'" on cylindrical surface 64, O-ring 36 is at the final crushed or distorted configuration and will assume a uniform sealing engagement with groove wall 38 when seal 28 is finally pushed into groove 42. In loaded position, FIG. 2, O-ring 36 will have a substantially uniform, untwisted cross section throughout its circumference. Similarly, seal 30 is first positioned as indicated in FIG. 4 and then axially moved along surfaces 72 and 66 into groove 46 such that O-ring 44 uniformly seals against groove wall 50 as shown in FIG. 5.

Oil ring assemblies 82,83 of FIG. 7 differ from oil ring assemblies 28 and 30 only in that rings 94,96 of V section are substituted for O-rings 36,48. The V section oil ring assembly presents the same loading problem as the O-ring assembly described above. The V rings can be made of elastomeric material same as O-rings 36,48 or can be made of resilient metal. The procedure for installing oil V ring assemblies 82,83 is the same as that described above with respect to O-ring assemblies 28,30.

It should be understood that while the resilient rings in the above illustration are of the elastomeric type generally referred to as "O" rings the invention herein disclosed can be used with any resilient ring whether it is resilient because of the displacement of the elastomer as shown in FIG. 2 or because of the deformation of a mechanical member such as that shown in FIG. 7. In any case, the fact that the sealing inner ring must be displaced to successfully install the assembly into the rotor will be greatly facilitated by the above device.

Sleeve 60 may be fabricated of any suitable material such as metal or plastic which is sufficiently durable to withstand the rigors of assembly-line use and which has a surface over which the O-rings may slide without grabbing or sticking. The sliding surfaces must, of course, be relatively smooth. Many conventional techniques may be used to fabricate sleeve 60, which techniques are well known in the art and need not be listed here. In one operating embodiment of the present invention, conical surfaces 70 and 72 converge at an angle 5° with respect to the axis of rotor 20. Seals 28 and 30 were inserted into their respective grooves using this device without notable variation in the cross section of the respective O-rings 36,48.

I claim:

1. The combination comprising a body having a first radially inwardly facing cylindrical wall surface having a first wall diameter, a second radially outwardly facing cylindrical wall surface having a second wall diameter which is greater than said first wall diameter and an end face surface which intersects said first and second wall surfaces, said first and second wall surfaces having parallel axes, a first annular resilient seal having a radially outwardly facing sealing edge with a first relaxed diameter and adapted for sealing engagement with said first wall surface, a second annular resilient seal having a radially inwardly facing sealing edge with a second relaxed diameter and adapted for sealing engagement with said second wall surface, and a loading device comprising an annular sleeve including means providing a first surface adapted to rest upon said end face surface and means defining first and second frustoconical surfaces coaxial with said wall surfaces respectively and converging axially outwardly of said first surface, said first conical surface having a minimum diameter equal to said first wall diameter and a maximum diameter at least equal to said first relaxed diameter, said second conical surface having a maximum diameter equal to said second wall diameter and a minimum diameter equal to or less than said second relaxed diameter.

2. The loading device set forth in claim 1 wherein said first and second wall surfaces are coaxial and wherein said maximum diameter of said first conical surface is equal to said minimum diameter of said second conical surface.

3. The loading device set forth in claim 1 wherein said sleeve further includes means defining first and second cylindrical surfaces of revolution coaxially with and radially facing in the same direction as said first and second wall surfaces respectively, said first cylindrical surface being axially immediately adjacent said first conical surface at the minimum diameter end thereof and having a diameter equal to said minimum diameter of said first conical surface, said second cylindrical surface being axially immediately adjacent said second conical surface at the maximum diameter end thereof and having a diameter equal to said maximum diameter of said second conical surface.

4. The combination comprising a rotary internal combustion engine rotor having an axially facing substantially flat end face, said rotor having at least one circular groove in said end face, said groove being defined by at least one annular radially facing groove wall having a first wall diameter; an annular metal sealing ring having a C-shaped cross section opening radially in a direction opposed to said groove wall; resilient sealing means captured within said sealing ring, said resilient sealing means having a sealing edge radially extending from said metal ring in a direction opposed to said groove wall and adapted for sealing engagement therewith, said sealing edge having a relaxed diameter; and an annular sleeve adapted to rest upon said end face coaxially with said groove, said sleeve having a frustoconical surface generally radially facing in the same direction as said groove wall coaxially therewith, said sleeve having a first diameter equal to said first wall diameter and a second diameter equal to said relaxed diameter; said sealing ring and sealing means being axially slidably insertable along said frustoconical surface into said groove whereby a uniform radial load is gradually applied to said resilient sealing means such that said sealing means retains a substantially uniform cross section when placed into sealing engagement with said wall surface.

5. The combination comprising a rotary internal combustion engine rotor having an axially facing substantially flat end face, said rotor having first and second radially spaced coaxially circular grooves in said end face, said first groove being defined by at least a first annular, radially inwardly facing groove wall having a first wall diameter, said second groove being defined by at least a second annular, radially outwardly facing groove wall having a second wall diameter which is greater than said first wall diameter; a first annular wear-resistant metal sealing ring having a C-shaped cross section opening radially in a direction opposed to said first wall surface; first resilient sealing means captured within said first sealing ring and having a sealing edge radially extending from said first sealing ring in the direction opposed to said first wall surface and adapted for sealing engagement therewith, said first sealing edge having a first relaxed diameter; a second annular wear-resistant metal sealing ring having a C-shaped cross section opening radially in a direction opposed to said second wall surface; second resilient sealing means captured within said second sealing ring and having a second sealing edge radially extending from said second ring in a direction opposed to said second groove wall and adapted for sealing engagement therewith, said second sealing edge having a second relaxed diameter; and an annular sleeve adapted to rest upon said end face coaxially with said first and second grooves, said sleeve including means providing first and second frustoconical surfaces of revolution converging axially outwardly of said end face coaxially with said wall surfaces, said first conical surface having a minimum diameter equal to said first wall diameter and a maximum diameter at least equal to said first relaxed diameter, said second conical surface having a maximum diameter equal to said second wall diameter and a minimum diameter equal to or less than said second relaxed diameter; said first sealing ring and first sealing means being axially slidably inserted along said first conical surface into said first circular groove whereby a uniform radial load is gradually applied to said first sealing means, and said second sealing ring and second sealing means being axially slidably inserted along said second conical surface into said second circular groove whereby a uniform radial load is gradually applied to said second sealing means.

6. The combination set forth in claim 5 wherein said sleeve further comprises means providing first and second cylindrical surfaces of revolution coaxially with and generally radially facing in the same direction as said first and second conical surfaces respectively, said first cylindrical surface being axially immediately adjacent said first conical surface at the minimum diameter end thereof and having a diameter equal to said minimum diameter of said first conical surface, said second cylindrical surface being axially immediately adjacent said second conical surface at the maximum diameter end thereof and having a diameter equal to said maximum diameter of said second conical surface.

7. The combination comprising an internal combustion engine rotor having an end face and an oil ring groove in said end face, an oil ring assembly comprising an annular sealing ring of C-shaped cross section opening radially opposite a side wall of said ring groove and a circular resilient sealing means located within said sealing ring and held in compression by the sealing ring against said side wall of the ring groove, a loading device for installing said sealing ring assembly into the groove comprising an annular member having a diameter at its base equal to the diameter of the wall against which the resilient sealing member seals, a wall of said annular member tapering axially from the base diameter toward its outer edge to a diameter of different magnitude than the diameter of the wall against which the resilient member seals whereby when the sealing ring assembly is moved axially along said tapered surface and with the resilient sealing member in contact with the tapered surface the resilient member is compressed between the metal sealing ring and the tapered surface and slides along the said surface into the ring groove of the rotor without twisting.

* * * * *